Feb. 25, 1969  R. L. HURTLE  3,430,016
ELECTRIC CURRENT INTERRUPTING DEVICE
Filed April 15, 1966
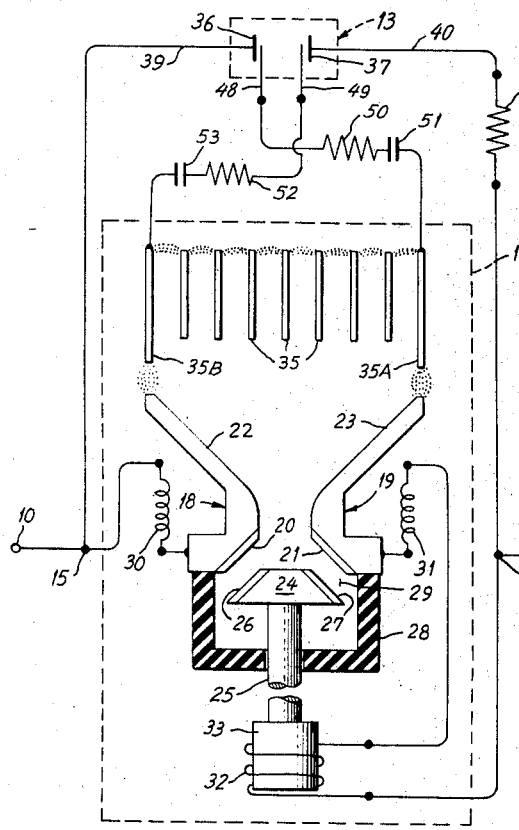
FIG. 1
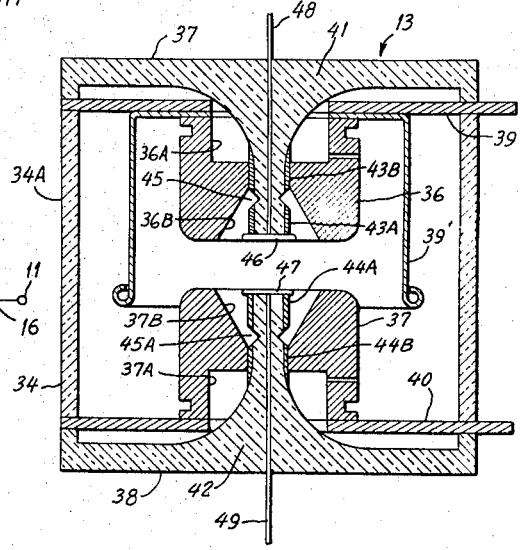
FIG. 1A  FIG. 1B
FIG. 2
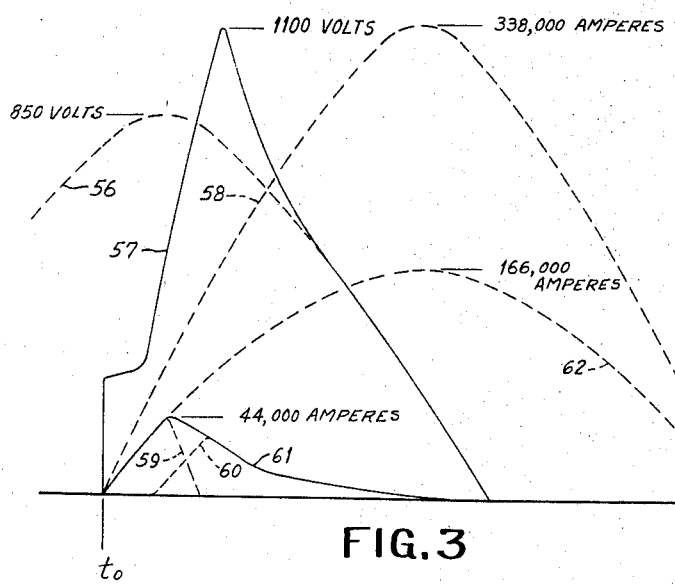
FIG. 3
INVENTOR
RALPH L. HURTLE
BY Robert H. Casey
ATTORNEY INVENTOR
RALPH L. HURTLE
BY Robert A. Casey
ATTORNEY

3,430,016
ELECTRIC CURRENT INTERRUPTING DEVICE
Ralph L. Hurtle, West Hartford, Conn., assignor to General Electric Company, a corporation of New York
Filed Apr. 15, 1966, Ser. No. 542,806
U.S. Cl. 200—144                         16 Claims
Int. Cl. H01h 9/30, 33/00, 9/38

The present invention relates to electric current interrupting devices, and particularly to interrupting devices of the type in which the interruption is initiated in a first path and then is transferred to and finally completed in a path electrically in parallel to the aforesaid first path. For convenience, this technique of current interruption is referred to as "parallel assisted current interruption."

In copending application Serial No. 457,557, Hurtle and Willard, filed May 21, 1965, and assigned to the same assignee as the present invention, an electric circuit breaker of novel construction and operation is disclosed which is capable of generating and maintaining an arc voltage during interruption which substantially exceeds the line voltage of the power system in which the circuit breaker is desirned to be used. The circuit breaker is therefore able to halt the rise of short-circuit and to drive the current to zero and extinguish it with a true "current-limiting" action in a manner not achievable by prior art contact-separating current interrupters, but only by special "current-limiting" fuses.

While circuit breakers constructed in accordance with the invention of the aforesaid application accordingly exceed prior circuit interrupters in performance (ability to interrupt stated magnitude of available short-circuit current) by a ratio of at least ten to one, it has been discovered in accordance with the present invention that the performance and capability of the circuit breaker of the aforesaid application can itself be further improved by a ratio of two to one by means of the present invention.

In accordance with prior circuit interrupting art, particularly in the medium and high voltage ranges, numerous attempts have been made to extend the range and capability of contact-separating circuit breakers by the general technique of "assisted current interruption"; i.e., initiating current interruption by a contact-separating device or circuit breaker, followed by transfer of the current to a path electrically in parallel with all or part of the current path through the circuit breaker, and then by extinction of the current.

Such parallel "assisting" paths have included resistors in parallel with all or a portion of the arc chute of the circuit breaker, capacitors in a similar circuit location, and combinations of resistors and capacitors. At least one prior patent [1] proposes use of a pair of spaced electrodes in parallel with the separable contacts, there being a resistor in series with the spaced electrodes, the arc being stated to be transferred to this gap-plus-resistor path after initiation between the main contacts. In some of such devices, the entire original arc is by-passed, while in others, only a portion of the arc is transferred to a parallel path.

In another prior art patent [2] it is proposed to initiate interruption between separable contacts and then to transfer the current to a parallel path including a vacuum switch which at the time of transfer is in closed condition, followed by final interruption by opening of the vacuum switch.

The ultimate objective of the "assisted interruption" technique is, as the name suggests, to assist or relieve the primary device or circuit breaker of a substantial part of the duty of interrupting. In general, however, the prior art makes at best only a token contribution to achievement of this objective, and the improvement in performance is scarcely justified by the added expense and complication of the "assisting" apparatus.

Statement of objects

It is an object of the present invention to provide an electric circuit interrupter including an electric circuit breaker of the type having separable contacts for drawing an arc, and means for assisting the interruption of the current whereby the interrupting capacity of the circuit breaker is greatly increased over the capacity of the circuit breaker device alone.

It is another object of the invention to provide an electric circuit interrupter of the assisted current interruption type which is able to perform a current-limiting action in circuits having available short-circuit currents far exceeding the maximum which the circuit breaker device alone would be capable of interrupting.

It is another object of the invention to provide an electric circuit breaker of the type described which is relatively simple in construction and utilizes a minimum of moving parts and mechanism.

It is another object of the invention to provide an electric circuit breaker of the contact-separating type in which current interruption is initiated by a pair of separable contacts to insert an arc in series with the circuit to limit the amount of current flowing in the circuit, and means for transferring the reduced current to a parallel path in which the current is prevented from rising further and is gradually reduced to zero at voltage zero in the alternating current system.

It is another object of the invention to provide an electric circuit interrupter including an electric circuit breaker having separable contacts for creating an arc to limit the current and means for transferring such limited current to a shunt path, combined with means for further reducing the current in the shunt path and finally extinguishing it.

It is another object of the invention to provide an electric circuit breaker of the type described which is suitable for use in medium voltage circuits without the necessity for gas or oil blast means and which is capable of performing a current-limiting interruption at said voltages.

Other objects of the invention will in part be pointed out in the following detailed description and in part will become obvious from the following detailed description of specific embodiments of the invention, and the scope of the invention will be pointed out in the appended claims.

In accordance with the present invention in one form, an electric circuit interrupter is provided comprising, in combination, a separable-contact type circuit breaker, and electrically in parallel therewith, a controlled-conductivity device in series with a resistor. The conductivity device is a device which is normally in nonconducting condition, but which, upon the application of a predetermined control voltage, is "triggered" to a conducting condition. Upon generation of an arc of predetermined voltage drop by the circuit breaker, the controlled conductivity device is triggered to conducting condition, and the current passing through the breaker is transferred to the parallel path. The resistor in series with the controlled-conductivity device, prevents the current from rising above the value at which transfer occurred and gradually reduces it to zero until the next succeeding voltage-zero of the A-C circuit.

In accordance with the invention in a preferred form, the contact-separating device comprising a high arc-voltage generating circuit breaker, having the ability to generate an arc with voltage drop at least equal to the line voltage of the power system in which the device is designed to be used within 3 milliseconds of the incidence ---
[1] 1,819,207, Sleplan, Aug. 18, 1931.
[2] 2,996,592, Heberlein et al., Aug. 15, 1961.

of a short-circuit condition. By this means, triggering and transfer of current occurs at a sufficiently early point so that the circuit breaker *not only is not called upon to perform the final interruption of the current, but also is not called upon to withstand the crest of short-circuit current which would otherwise occur prior to the first current-zero.* The invention encompasses in contemplation the use of conventional circuit breakers, the performance of which is substantially improved thereby. The degree of improvement, however, in the case of high arc voltage generating circuit breakers, is so great as to achieve dramatic increases in the interrupting ability of such breakers.

In accordance with a further important aspect of the invention, a resistor having a high positive temperature coefficient of resistance is provided in series with the controlled conductivity device. The resistance of the bypass path, therefore, at the time of transfer of current thereto, is of such a value as to permit the rapid transfer of current. Following transfer, however, the resistance of the resistor increases rapidly, thereby further decreasing the current and facilitating final extinction.

In accordance with the invention in one form, the controlled conductivity device utilized comprises a controlled-breakdown gap device having at least two power electrodes and a control or "trigger" electrode. One type of controlled-breakdown gap device is shown in Patent No. 3,087,092, Lafferty, issued Apr. 23, 1963 and assigned to the same assignee as the present invention. The trigger electrode of the controlled breakdown gap device is connected so that the high arc-voltage created by the circuit interrupter causes "triggering" of the device. The connection, moreover, is such that the trigger electrode does not receive voltage under normal open-circuit conditions of the circuit breaker but receives voltage while only an arc is drawn.

In accordance with a still further aspect of the invention, a control breakdown gap device is utilized having two main power electrodes and a *pair* of trigger electrodes, each associated with one of the main electrodes and so connected with respect to the high voltage circuit interrupter that triggering is caused by one of said trigger electrodes when the current flows in a first direction through the interrupter, and by the other electrode when the current is in the reverse direction. A controlled breakdown gap device of the type referred to is shown and described, for example, in Ser. No. 510,562, Lafferty, filed Nov. 30, 1965, 3,303,376, issued Feb. 7, 1967, and assigned to the same assignee as the present invention.

The invention will be more fully understood from the following detailed description, and its scope will be pointed out in the appended claims.

In the drawings,

FIGURE 1 is a semidiagrammatic illustration of a circuit interrupting device incorporating the present invention;

FIGURES 1A and 1B are schematic representations of circuit elements which may optionally be substituted in the device of FIGURE 1;

FIGURE 2 is a sectional view of a controlled-breakdown gap device used with one form of the present invention;

FIGURE 3 is a graph of current and voltage conditions existing in an electrical circuit during interruption of a short-circuit value current by a circuit interrupting device incorporating the present invention;

FIGURE 3 is a reproduction of a portion of the graph of FIGURE 3, on a different scale;

Figure 4:
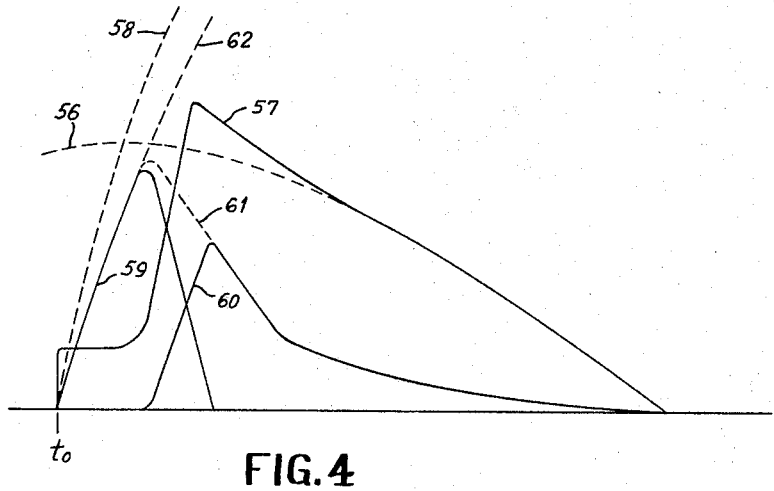

Referring to FIGURE 1, the invention is shown as incorporated in an electric circuit interrupting device having an input terminal 10 and an output terminal 11 and comprising a high arc-voltage generating circuit breaker indicated generally at 12 and a controlled-breakdown gap device indicated generally at 13. The controlled-breakdown gap device 13 is connected electrically in series with a resistor 14, the combination of the controlled-breakdown gap device 13 and resistor 14 being connected electrically in parallel with the circuit breaker 12 by connections at points 15 and 16 respectively.

*Construction of circuit breaker 12*

The circuit breaker 12 is described more fully in my aforementioned copending application Ser. No. 457,557, assigned to the same assignee as the present invention, and will be only briefly described here.

The circuit breaker 12 includes an insulating casing or support 17 having a pair of spaced stationary contact assemblies 18 and 19 mounted thereon by suitable means, not shown. The contact assemblies 18 and 19 include contact faces 20 and 21 respectively and arc runner portions 22 and 23, respectively. A generally wedged-shaped movable contact member 24 is carried at the end of a contact operating rod 25 and has contact faces 26, 27. The area adjacent the movable contact is enclosed by a generally cup-shaped insulating enclosure 28 to form a pressure chamber 29. A first arc blowout coil 30 is connected between the stationary contact assembly 18 and the connection 15 leading to the input terminal 10. A second blowout coil 31 is connected between the stationary contact assembly 19 and the solenoid coil 32, which in turn, is connected to connection point 16 leading to the output terminal 11. Special magnetic pole pieces, not shown, direct the flux generated by the coils 30, 31 to the arc area, in a manner to be described. The solenoid 32 includes a movable plunger portion 33 connected to the contact operating rod 25.

The current path through the circuit breaker 12 therefore is as follows: in at terminal 10, to connection point 15, to blowout coil 30, to stationary contact assembly 18, to contact face 20, to contact face 26, through movable contact 24 to contact face 27, to contact face 21, to stationary contact assembly 19, to blowout coil 31, to solenoid 32, to connection point 16, to output terminal 11.

A plurality of relatively closely spaced arc cooling plates 35 are also provided, disposed in a row extending transversely of the direction of arc movement, the end plates 35A, 35B being slightly longer than the other plates.

The movable contact member 24 is normally retained in closed circuit position, i.e., with the faces 26 and 27 in contact with the faces 20 and 21 respectively, by suitable means, not shown, which may be manual and/or automatic. The movable contact 24 is, however, movable from closed to open circuit position by the action of solenoid 32 upon the occurrence of sufficiently high current therethrough, irrespective of the condition of such manual and/or automatic operating mechanism. The movable member 24 is sheown in retracted position in FIGURE 1 for convenience.

*Construction and breakdown of the controlled breakdown gap device*

As previously mentioned, a controlled-breakdown gap device 13 is connected in series with a resistor 14 across the terminals 15 and 16 of the circuit breaker 12. In the embodiment illustrated, the controlled-breakdown gap device 13 is constructed generally as described in aforesaid application Ser. No. 510,562 and comprises a gas-impervious insulating enclosure evacuated to a hard vacuum such as $10^{-5}$ mm. of mercury or less.

The gas impervious insulating enclosure 34 of the controlled-breakdown gap device 13, as shown in FIGURE 2, comprises a cylindrical central body portion 34A closed at either end by insulating end gap assemblies 37, 38. Metallic electrode supporting discs 39 and 40 respectively are trapped between the end cap assemblies 37, 38 respectively, and the central body portion 34A. A pair of main electrodes 36 and 37 are supported on the supporting discs 39, 40, respectively. Each of the electrodes 36, 37 has an opening axially therethrough, the opening comprising a first generally cylindrical outer portion 36A, 37A, a second tapering or conical inner portion 36B, 37B, respectively. Each of the end caps 37, 38, includes a centrally located, inwardly-directed pedestal portion 41, 42, respectively, extending through the central portions of the apertures in the electrodes 36, 37 respectively. The pedestal portions 41, 42 each have applied thereto a coating of a metal such as titanium, which is a good "getter" for active gases, such as hydrogen and which absorbs a large quantity thereof. After the coating of titanium has been applied, a groove 45, 45A is cut around the circumference of each of the pedestals 41, 42, respectively, so as to remove the titanium therefrom and expose the insulating ceramic material, thereby dividing the coating of titanium on each pedestal into two portions comprising a first portion 43A, 44A at the outer portion of each pedestal and a second portion 43B, 44B at the inner portion of each pedestal. The coating portion 43B is in contact with the electrode 36 and the coating portion 44B is in contact with the electrode 37. The pedestals 41, 42 each has a conductive cap 46, 47 respectively, on the end thereof, to which conducting leads 48, 49 are connected by suitable means such as by soldering the leads 48, 49 each passing through an elongated aperture axially in the pedestals 41, 42.

It will be observed that the conductors 48, 49 are each electrically common with the caps 46, 47 respectively and with the coating 43A, 44A at the outer portion of the respective pedestals, and that these elements are electrically separated from the coatings 43B, 44B and the electrodes 36, 37, by means of the grooves 45, 45A.

Upon the application of a sufficient "triggering" voltage between the conductor 48 and the electrode 36, a spark discharge is initiated across the groove 45. This discharge causes heating of the titanium film and consequent release of hydrogen from this metal in the vicinity of the arc. The hydrogen becomes ionized and creates a highly conducting arc between the opposite sides of the groove 45. The arc is rapidly moved upwardly along the tapered edge 36B of the cathode electrode 36 until it reaches the edge thereof and establishes a cathode spot along the portion of the cathode 36 which is parallel with the corresponding surface of the electrode 37. If sufficient voltage exists between the main electrodes 36, 37, a breakdown will now occur between these electrodes across the main gap, creating an arc capable of conducting high current. In like manner, the application of a sufficient "triggering" voltage between the conductor 49 and the electrode 37 causes a spark discharge to be initiated across the groove 45A.

Once an arc has been established across the main arc gap, a subsequent decrease of such arc current to zero, such, for example, as upon the decrease of current in an alternating current circuit to the zero point, the arc is quickly extinguished and the conduction carriers within the envelope disappear. Such conduction carriers are essentially electrons and ionized copper atoms from the electrodes. The ions diffuse to the electrodes, to the shield 39' or to one of the exposed side or end walls of the device and are deionized and removed. The hydrogen ions from the trigger gap are essentially reabsorbed or "gettered" by the titanium film as soon as the arc is transferred from the triggered electrode to the main electrodes. Since the envelope is maintained to a high vacuum and essentially no ionizable gases are present, the gap between the main electrodes recovers rapidly and no further current flow occurs until triggering occurs again. Such recovery occurs in less than one-tenth of one millisecond. Typical recovery times for instance are from 25 to 100 microseconds after extinction of the arc.

As shown in FIGURE 1, the controlled-breakdown gap device 13 has the trigger conductor 48 thereof connected electrically in series with a resistor 50 and a capacitor 51 to end plate 35A of the circuit breaker 12. Likewise a resistor 52 is connected electrically in series with a capacitor 53 between the trigger conductor 49 and end plate 35B of the circuit breaker 12. If desired, the capacitors 51 and 53 may be omitted but they are included in the preferred form to limit the current flow in the trigger circuit to that necessary to cause breakdown of the main gap.

*Operation of the invention*

The operation of the present invention will be understood by reference to the above description and FIGURES 1–4 particularly.

Assuming the circuit breaker 12 to be in the closed condition and connected in series with a suitable load, not shown, across a source of electrical power, not shown, it will be understood that *all* of the current flowing in the circuit normally passes through the circuit breaker 12, and *none* of the current passes through the parallel path comprising the controlled-breakdown gap device 13 and resistor 14. Upon the occurrence of a short-circuit condition, the current in the circuit increases extremely rapidly. When the current increases to a predetermined value, the solenoid 32 acts to move the movable contact 24 in opening direction.

As the movable contact 24 moves toward open circuit position, a pair of short arcs are drawn between the contact faces 20, 26 and 21, 27. The short arcs are immediately forced together by their magnetic fields combined with the action of gas generated by the arc impinging upon the adjacent insulating material. A single arc then exists between the contacts 20, 21, which rapidly moves out on the diverging arc runners 22, 23. By this time the arc has assumed a sustained high voltage condition due to the unique action of the circuit breaker 12. As the arc moves outwardly on the arc runners 22, 23, the intermediate portion of the arc touches the edges of the intermediate arc plates 35, and the ends of the arc contact the end arc plates 35A, 35B. When the arc contacts the end arc plates 35A, 35B, the voltage across the arc is applied between the electrode 36 and the trigger 48, as well as between the electrode 37 and the trigger 49. This voltage creates a pair of triggering arcs, one in each of the grooves 45, 45A, followed immediately by a breakdown of the main gap between the main electrodes 36, 37, of the device 13.

The controlled-breakdown gap device 13 includes means for creating triggering arcs at both electrodes 36, 37 in order to assure that the breakdown action will occur at an accurately controlled point of time regardless of the polarity of the triggering voltage, which in turn depends on the polarity of the alternating voltage existing in the main circuit at that particular instant.

When triggering occurs, the high voltage existing across the breaker 12 causes breakdown of the gap between the main electrodes 36, 37, followed by current flow through the parallel path including the controlled breakdown gap device and the resistor 14. It is important to note that upon breakdown of the device 13, *all* of the current is transferred to the parallel path made up of the controlled-breakdown gap device 13 and the resistor 14, and the arc in the breaker 12 is completely extinguished.

This rapid and complete transfer of the current from the breaker arc path to the device 13 and resistor 14 path is due to two factors: (1) the high voltage-drop existing across the breaker path at this time and maintained by the breaker during transfer and (2) the negative voltage-vs.-current characteristic of the arc in the circuit breaker. Thus in the 600-volt RMS circuit (peak 850 volts) of the interruption illustrated in FIGS. 3 and 4, the circuit breaker 12 generates an arc having a voltage-drop such that the total voltage-drop across the breaker is 1000 or more volts. Since the current at the time of transfer is about 40,000 amperes and the resistance of resistor 14 (cold) of .019 ohm, it is obvious that with all of such current flowing through the shunt path, the drop through such path would be less that 1000 volts. The shunt path is therefore a "preferred" path since there is always a dominating or transferring voltage in the circuit breaker path.

The negative voltage-vs.-current characteristic of the arc in the circuit breaker also accelerates transfer. In accordance with this characteristic, a decrease in current thru the arc, such as caused by introduction of the shunt circuit, causes an increase in voltage across the arc. Thus the current transfer proceeds at an exponentially increasing rate until all the current is transferred and the arc extinguished.

Although the invention has been described in its preferred embodiment in connection with a high arc voltage generating circuit breaker, it will be understood that the invention is also usable with conventional circuit breakers which include separable contacts creating an arc therebetween, but in which the arc voltage drop does not exceed the line voltage of the system in which the circuit breaker is to be used. When incorporated in such circuit breakers, the present invention does not afford a "current-limiting" action. Instead, arcing by the conventional circuit breaker occurs upon the occurrence of a short-circuit condition, but triggering and transfer of the current to the controled-break-down gap device does not occur until the first curent zero. This is for two reasons, (1) the voltage appearing across the circuit breaker is greatest immediately folowing the current zero, and therefore the voltage tending to cause transfer or flow of current in the parallel path is greatest at this time, (2) the parallel path, for practical purposes, must include a resistor 14 to limit the flow of current therethrough in order to prevent the destruction of the controlled-breakdown gap device; therefore this shunt path will not accept current of substantial value since, when flowing through the resistor in this path, it would cause an IR or voltage drop greater than the instantaneous driving voltage. Immediately following the zero current point, however, the current has a very low value, and therefore such IR drop is likewise very small. Transfer of the current, or build up from zero of current in the shunt path therefore occurs at this time. The resistance of the resistor 14, which is preferably a positive temperature coefficient of resistance material, increases rapidly, limiting the magnitude of the current, and when the next current zero point is reached in the alternating current cycle, the current is extinguished by the controlled breakdown gap device, since the arc chamber of the conventional circuit breaker has, by this time, had time in which to recover dielectric strength between its separated contacts. In accordance with the present invention the interrupting capacity of such conventional circuit breakers may be increased by a factor of at least 2.

In accordance with the invention, the resistor 14 is of a material having a high positive temperature coefficient of resistance—that is, a material whose resistance increases rapidly with temperature. As soon as current begins to flow through the parallel path, including the device 13 and ressitor 14, therefore, the resistance of the resistor 14 increases very rapidly, thereby further depressing the current and improving the power factor of the circuit, that is, making it more nearly a purely resistive or unity power factor circuit.

The current continues to flow through the device 13 and resistor 14 at reduced value until the circuit voltage decreases to zero, at which time the current is extinguished. The current remains extinguished, even though the voltage of the circuit rises again, because of the fact that the gap device 13 has extremely rapid recovery time, as noted above. The circuit breaker 12, although its recovery time is not as fast as that of the gap device 13, by the time the voltage again rises following current-zero, has had ample time to recover its voltage-withstand capability since it will be recalled that arcing in the circuit breaker 12 was completely discontinued upon initial transfer of current to the parallel path including the gap device 13. It will be noted, as will also be described more fully hereinafter, that the current and the voltage decrease to zero at substantially the *same instant*, thereby greatly facilitating the extinction without the danger of further arcing, since at the time the current reaches zero the voltage is also zero, and therefore there is no voltage tending to cause immediate re-breakdown of the arc gap. This, of course, is another way of stating the benefit resulting from the action of the interrupter in converting the circuit, transiently, into a circuit having a very nearly unity power factor.

*Performance of the invention in specific exemplary circuits*

The graphs of FIGURES 3–6 are based on actual oscillograms taken during interruptions performed by a circuit interrupting device constructed in accordance with the invention. FIGURE 3 is a graph based on an oscillogram record of an actual test of the invention and showing pertinent instantaneous current and voltage conditions in an alternating-current circuit having a source voltage of 600 volts RMS and a peak available short-circuit current of 382,000 amperes. The traces shown are as follows:

56—instantaneous source voltage
57—instantaneous voltage appearing across the terminals of the interrupter of the invention
58—instantaneous aavilable short-circuit current
59—instantaneous current through circuit breaker 12
60—instantaneous current through gap device 13
61—total instantaneous current in circuit (total of breaker 12 current and device 13 current)
62—instantaneous "prospective" short-circuit current It may be assumed that prior to time $t_0$ of FIGURE 3, the circuit breaker was closed, with nominal current, such for example as 100 amperes, flowing in the circuit. (On the current scale used in FIGURE 3, this value is not perceptible.) At the time $t_0$, however, a short-circuit condition suddenly occurs. It will be observed that at this instant of time, the source voltage 56 is approaching, but has not fully reached, its highest positive instantaneous value, of about 850 volts. Since we have assumed the circuit breaker 12 to be in closed condition prior to the occurrence of the short circuit condition, the voltage across the circuit breaker prior to time $t_0$ is extremely small, and therefore imperceptible on the voltage scale used in FIGURE 3.

Trace 58 indicates the instantaneous value which the "available" short circuit current would reach if a complete short circuit condition existed with no load impedance whatsoever to the flow of source current, such for example, as the impedance presented by the circuit breaker and the arc created by the circuit breaker.

Trace 59 represents the instantaneous values of the current which flows through the circuit breaker 12 during the interruption.

Trace 60 represents the instantaneous values of the current which flows through the controlled gap device 13 during the interruption.

It will be observed from FIGURE 3, that the voltage appearing across the interrupter (trace 57) reaches a peak of 1100 volts, whereas the peak voltage of the source is only about 850 volts. Thus the circuit breaker arc voltage exceeds or dominates" the source voltage, causing reversal of the current rise. Also it will be noted that the short circuit current, if completely unrestrained (trace 58) would reach a peak of 338,000 amperes. The actual current, permitted to flow by the interrupter, however (trace 61) reaches a peak of only 44,000 amperes.

The most significant portions of the graph of FIGURE 3 are represented on enlarged scale as to current, and on reduced scale as to voltage, in FIGURE 4, for the purpose of facilitating analysis and explanation. Referring now to FIGURE 4, it will be observed that prior to time $t_0$, the current through the circuit breaker, indicated by the trace 59, is of only nominal value and therefore imperceptible on the scale of this graph. At the time $t_0$, however, the current through the circuit breaker 12 rises rapidly as indicated by the trace 59 until about .75 millisecond. In this extremely short space of time, the solenoid 32 acts on the plunger 33 and contact rod 25 and movable contacts 24 to move them in open circuit direction far enough to draw a pair of arcs, not shown, these arch quickly joining to form a single arc which is elongated and moved upwardly along the arc runners 22, 23 in a manner previously described thereby inserting a substantial resistance in the circuit and an arc voltage exceeding the normal line voltage of the circuit. This arc resistance or opposition to current flow halts the rise of current through the circuit breaker 12 at about 44,000 amperes.

It will be observed that whereas the voltage drop across the interrupter prior to time $t_0$ was very minute and therefore imperceptible on the scale of the graph of FIGURE 4, this voltage drop increases rapidly to nearly 200 volts at the instant the short circuit occurs. This instantaneous rise of vlotage across the interrupter is due to the voltage appearing across the device because of the inductance of the device, including particularly the coils 30, 31, and the solenoid 32. The voltage drop across the device stays at this level for about .60 millisecond. It will be observed that during this time, the current through the breaker is increasing extremely rapidly, and if no further impedance were introduced in the circuit by the arcing as previously described, the current would continue to rise and would reach a peak "prospective" value of 166,000 amperes as indicated by trace 62 of FIGURE 3.

The action of the high arc voltage circuit breaker 12, however, causes the voltage across the interrupter to increase sharply at about .750 millisecond after short circuit, as indicated in the graph, cresting the current at this point.

When the circuit breaker draws its high voltage arc and the arc reaches the end arc plates 35A, 35B, the voltage appearing across the arc is applied to the triggers of the controlled gap devices 13 through resistors 50, 52 and capacitors 51, 53. This voltage appears between the trigger 48 and the electrode 36 since the electrode 36 is electrically connected to the terminal 15 of the circuit breaker whereas the trigger 48 is connected to the arc plate 35A which is at the opposite side of the circuit breaker. Likewise, the arc voltage appears between trigger 49 and the electrode 37, since the electrode 37 is connected to the terminal 16 of the circuit breaker and the trigger 49 is connected to the arc place 35B at the opposite side of the circuit breaker. When the arc voltage reaches a substantial value, such for example as at least 100 volts, a "triggering arc" is created between each of the trigger electrodes 48, 49 and its corresponding electrode 36, 37. Since the voltage across the interrupter, that is between the terminals 15, and 16, has risen to a very substantial value, comprising the initial voltage drop of about 200 volts, plus the arc voltage drop, so that the total now approaches 1100 volts, a substantial voltage also exists between the electrodes 36 and 37 of the controlled gap device 13. Since the space between these electrodes has now been rendered highly conductive by action of the triggering arcs in a manner more specifically described the aforesaid Lafferty patent and application, a breakdown occurs between the main electrodes 36, 37, and current begins to flow through the bypass path including the device 13 and the resistor 14. This current is represented on graphs of FIGURES 3 and 4 by the trace 60. In a very short space of time the current through the bypass path increases rapidly, while the current through the circuit breaker 12 decreases rapidly, indicating the transfer of current from the circuit breaker path to the bypass path, as indicated in the graphs. The total current flowing in the circuit during this time, of course, is the total current flowing through the two paths, and this is indicated by the trace 61.

It will be observed from FIGURE 4 that the current through the circuit breaker 12, as indicated by the trace 59, reaches a crest which is slightly below the crest indicated by the curve 61 for the total current in the circuit. This is because at the time of cresting, the parallel path through the control device 13 has just been cut in by the triggering action, and this parallel path affords opportunity for a slightly increased current flow. It will be observed, further, however, that the current does not continue to increase despite the introduction of this parallel path, but instead, the net current as indicated by the trace 61 decreases very sharply toward zero. This is primarily due to the novel action of the high arc voltage circuit breaker 12 which exerts on the arc existing therethrouhg such a high extinguishing action that the current is not forced through the parallel path including the controlled gap device 13 but is also actually diminished in total magnitude sharply. In this connection, it is important to note that the resistor 14 included in the bypass path is of substantial value initially and furthermore rapidly increases in value due to its positive temperature coefficient of resistance characteristic. Thus while the bypass path through the control gap device 13 and the resistor 14 may be thought of as an escape valve relieving the circuit breaker 12 of some of the opposition to its rapid extinction of the arc therethrough, it also represents a valve which following initial action is gradually closed to decrease the extent of this path as an escape route for the current.

The importance of the action of the circuit breaker on the arc during the transfer time is further pointed up by the fact that *the voltage across the entire interrupter is increasing very rapidly all during the time of the transfer of current, as indicated by the trace 57.* It has been well known to use a bypassing or "crowbarring" action to relieve circuit breakers of their interrupting duty in the past, but in the past such crowbarring action has primarily amounted to removing the interruption process from one location or from one device to another device, thehre being no substantial decrease in total current flowing during such transfer process. In the present case, however, as shown clearly by the graphs, the combination of the invention is actually *performing a sharp current-limiting action while the transfer of current is taking place.* It will also be observed that in the particular test, the results of which are illustrated in FIGURES 3 and 4, the transfer of current from the circuit breaker 12 to the control gap device 13, with concurrent current-limiting action, takes place during a period when the system voltage is at its highest portion of its cycle. This test is more severe than a test in which the short-circuit condition is initiated at the exact zenith or highest point of the system voltage, since when the actual interruption takes place, necessarily at a subsequent time, the system voltage is on the decrease and will continue to decrease thereafter.

Following completion of the transfer of current, the current continues to decrease due to two factors. First, the system voltage is decreasing at this time. Thus the action of the interrupter in inserting the high resistance first of the arc of the circuit breaker 12 and then the resistance 14 plus the arc in the control gap device 13, has the net effect improving the power factor of the circuit, that is, making it primarily a resistive circuit, in which the current decreases substantially simultaneonsly with the applied voltage. Secondly although the resistance 14 is of substantial value when first introduced, it also has as previously mentioned, a high temperature coefficient of resistance, and therefore its resistance value continues to increase due to the heating action of the current passing therethrough. This increased resistance serves to further decrease the total current. These two factors cause the "fairing out" of the current graph, the current gradually decreasing until the system voltage reaches zero, at which time the current also reaches zero and complete extinction occurs.

The fact that the current reaches zero at the same time as the system voltage is extremely important, since the ability of the controlled gap device 13 to prevent the recurrence of restriking of an arc in the opposite direction following current zero when the voltage increases in the opposite direction, requires that it have time, even if only an extremely minute amount of time, to reestablish its dielectric condition. While this time is not substantial, this requirement represents a limiting factor in determining the upper limits of performance of the device 13. If the current were to reach zero at a time when the voltage was not zero, there would be a tendency for a restriking to occur because during the time when there was no current through the device, there would be a substantial applied voltage in the opposite direction.

FIGURES 1A and 1B indicate alternative circuit elements which may be used instead of the resistor 14 of FIGURE 1. Thus in FIGURE 1A there is shown a parallel combination of resistor 14A and capacitor 14B. The addition of the capacitor 14B facilitates the transfer of the current to the parallel path, since at the instant of breakdown of the device 13, the capacitor 14B in effect by-passes the resistor 14A and there is therefore extremely small opposition to flow of current in the by-pass path. After breakdown has occurred, however, the capacitor 14B becomes charged, and the current is then forced to flow through the resistor 14A, thereby reducing the current and the action thereafter being as previously described.

As shown in FIGURE 1B, I may also utilize a "change-of-state current-limiting device" as shown in my prior Patent 3,117,203 issued Jan. 7, 1964 and assigned to the same assignee as the present invention. This device is described in detail in my aforesaid patent, and will be only briefly described here. This device, which is represented only diagrammatically in FIGURE 1B, comprises a central insulating member such as a ceramic wafer, having a small opening therethrough interconnecting two metallic electrode members which close the opening at either side. The opening contains a fusible metallic material, such for example, as mercury, and low values of current are conducted through the device without causing any substantial change therein. Upon the occurrence of higher values of current, however, the mercury in the opening is transformed to the arc plasma state, although confined substantially to its initial volume, thereby sharply increasing the total resistance volume, thereby sharply increasing the total resistance of the device to the flow of current. When used in the circuit of FIGURE 1, in place of the resistor 14, the element 14C permits breakdown of the control gap device 13 with little opposition to current flow. Following initial current flow, however, the mercury in the device 14C is transformed to its arc plasma state, thereby presenting a high resistance to the flow of current and reducing the total current in the circuit accordingly. The dimensions and capacity of the device 14C, for such application, are preferably chosen so that complete transfer to the bypass path occurs just prior to the transformation of the device 14C to its high resistance condition.

Figure 5:
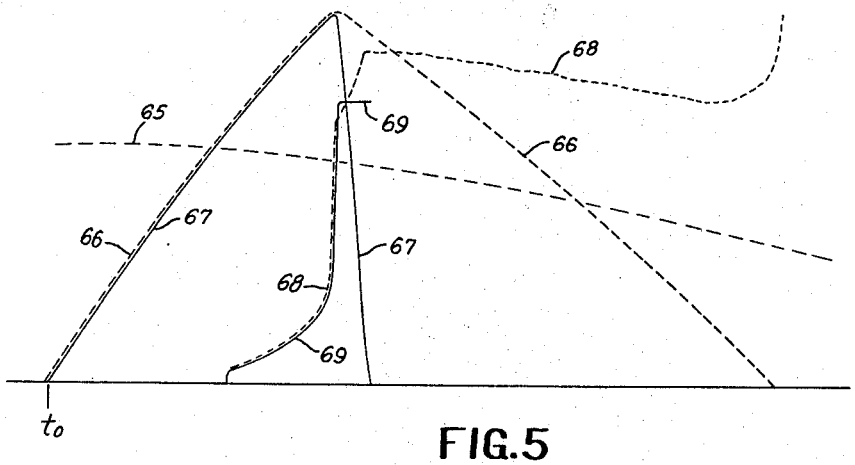
FIGURE 5 is a graph of current and voltage conditions existing in a test circuit during operation of a circuit interrupting device incorporating the present invention, and on the same coordinate axes, a superimposed graph of current and voltage conditions existing during interruption of the same circuit by a high arc-voltage generating circuit breaker alone.
Figure 6:
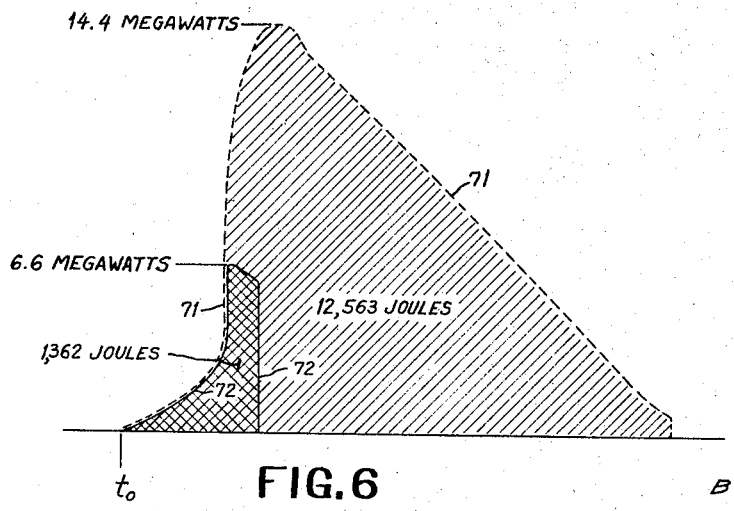
FIGURE 6 is a graph showing the energy and power conditions existing during interruption of a test circuit by a high voltage generating circuit breaker alone and, superimposed thereon, by a circuit interrupter incorporating the present invention.

The graphs of FIGURES 5 and 6 compare the performance of the present invention to the performance of the prior art circuit breaker 12 by itself, unaided. FIGURE 5 shows current and voltage conditions existing in the circuit breaker 12 during interruption of the same circuit (a) by the circuit breaker 12 alone (traces 66 and 68) and by the present invention (traces 67 and 69).

In FIGURE 5, the trace 66, shown in dotted lines, represents the graph of instantaneous values of the current passing through the circuit breaker 12 in performing an interruption of a circuit of 600 volts with 32,000 amperes short circuit current available. It will be observed that the current through the breaker rises to peak of 13,300 amperes and then decreases to zero, being extinguished at approximately 2.6 milliseconds from time $t_0$.

In the same figure, the trace 68, also shown in dotted lines, is a graph of the instantaneous values of the voltage existing *across the arc* drawn by the circuit breaker 12 in performing the same interruption. It will be noted that this curve does not begin until approximately .64 millisecond after $t_0$, since this amount of time is required for the contacts to separate and to create an arc. The arc voltage terminates at the right hand portion of the graph in an upwardly directed surge or "spike," at which time the arc is extinguished. It will be observed that the voltage in this case rises to a value about 400 volts above the instantaneous source voltage, and maintains this differential for about 1.3 milliseconds before the arc is extinguished terminating in a sharp voltage spike.

The curve 67 represents the graph of the instantaneous values of the current through the circuit breaker 12 in the combination of the present invention under the same conditions and in the same circuit as described above. It will be observed that the initial part of this trace is substantially identical to the trace 66, since triggering of the controlled breakdown gap device has not yet occurred. The current therefore rises to the same peak, of about 13,300 amperes. The current through the breaker, thereafter, however, decreases to zero with extremely great rapidity, as indicated by the nearly vertical right hand portion of trace 67. The great difference in negative slope of the trace 67 compared to the corresponding portion of trace 66 is due to the action of the controlled breakdown gap device in accepting the current transferred to it as the current in the breaker decreases to zero.

The trace 69 represents a graph of the instantaneous values of the voltage existing *across the arc* drawn in the circuit breaker 12 in the combination of the present invention. It will be observed that in this case, the initial part of the voltage curve for the arc voltage is substantially identical to the corresponding trace of arc voltage for the breaker alone (68), but, when triggering occurs, and transfer of the current to the controlled breakdown gap device takes place, the voltage trace 69 levels off until the arc through the circuit breaker is extinguished at approximately 1.14 milliseconds. It will be observed that the trace 69 terminates at a point which is the same point in time as the termination of the current trace 67. The area enclosed in the space defined by the right hand portions of the traces 66 and 67 and the time axis of the graph is indicative of the amount of assistance afforded to the breaker 12 by the action of the controlled breakdown gap device, since the *energy* which the breaker sees is porportional to $I^2t$. The total energy difference therefore would be proportional to the area enclosed by a line representing a graph of the instantaneous values of the current trace 66 squared and the corresponding trace of the trace 67 squared.

The power and energy difference in the two cases is illustrated graphically in FIGURE 6. In this figure, the trace 71 represents the instantaneous values of power in the circuit breaker 12 during the interruption represented in FIGURE 5 performed by the breaker unassisted by the controlled breakdown gap device. The trace 72, on the other hand, represents the instantaneous values of power in the circuit breaker 12 in the combination of the present invention. As indicated in the graph of FIGURE 6, in the circuit breaker when unassisted, the peak power is 14.4 million watts, whereas the power in the breaker in the present invention is only 6.6 million watts. The total energy required to be dissipated by the circuit breaker is indicated by the area under the respective curves. The total energy dissipated in the breaker 12 unassisted is about 12,563 joules, whereas in the breaker in the present invention, the total energy is only 1362 joules.

Other embodiments

Figure 7:
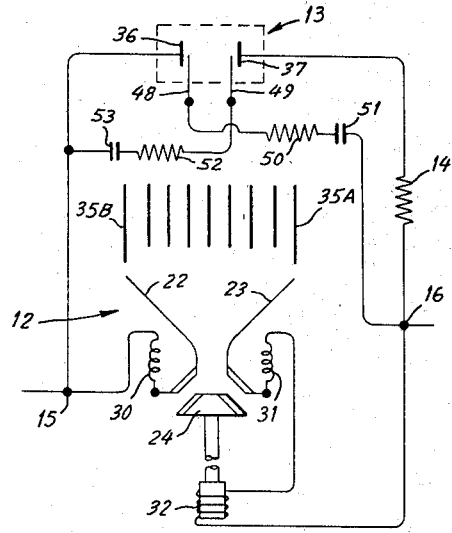
FIGURES 7–10 are illustrations in semi-diagrammatic form of other embodiments of the invention.
Figure 8:
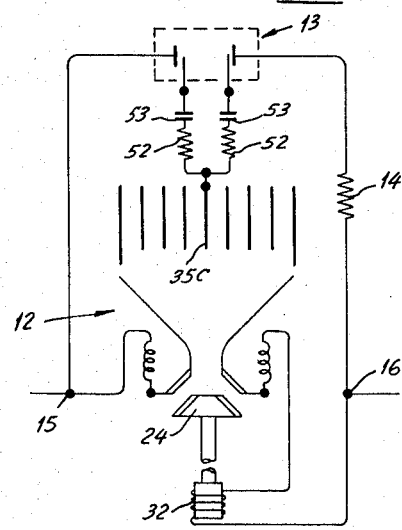
Figure 9:
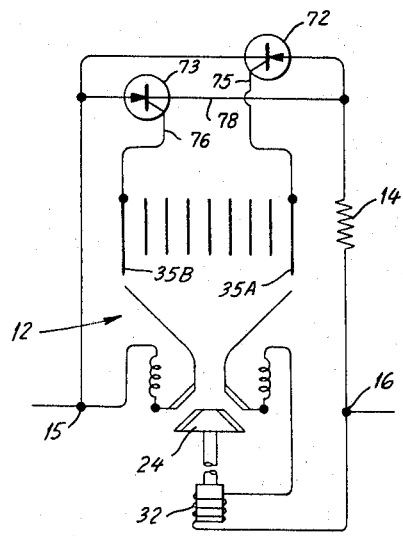

In FIGURES 7–9 there are illustrated further embodiments of the invention, all of which utilize the same type of high arc voltage generating circuit breaker 12, and controlled breakdown gap device 13 as described in connection with FIGURE 1. The construction and operation of the circuit breaker 12 and controlled breakdown gap device 13 are as described in connection with FIGURE 1. In the arrangement illustrated in FIGURE 7, however, the trigger electrodes 49, 48, of the controlled breakdown gap device 13, are connected respectively to the circuit breaker terminals 15, 16, rather than to the end arc plates 35A, 35B as shown in FIGURE 1. Thus the entire voltage drop appearing across the circuit breaker 12 is utilized in this form as triggering voltage as compared to the voltage appearing across the arc only. In accordance with the invention in this form, the controlled breakdown gap device is constructed such that the value of voltage required to cause triggering lies substantially *above* the voltage of the source to which the interrupter is to be connected. Thus, even though the source voltage therefore appears between the trigger electrodes 48, 49 and the main electrodes 36, 37, respectively, when the circuit breaker 12 is in the open circuit position, triggering does not occur. When the short circuit condition occurs, however, and is interrupted by the circuit breaker 12, in the manner previously described, at which time the voltage generated by the circuit breaker 12 substantially exceeds the line voltage, this voltage apears as triggering voltage on the device 13, causing breakdown of the device 13 and transfer of the current thereto from the circuit breaker 12 in the manner described in connection with the embodiment of FIGURE 1.

Figure 10:
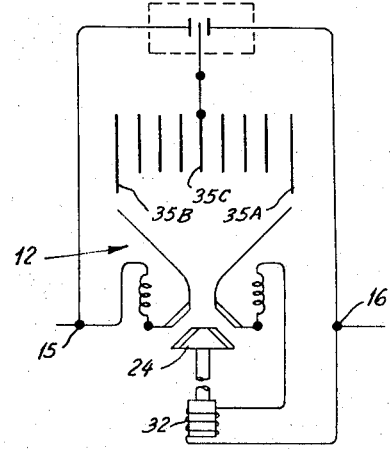

In FIGURE 8, a further embodiment of the invention is shown. In this embodiment, the trigger electrodes 48, 49, are both connected to a centrally located arc plate 35C of the interrupter 12, through the resistors 52 and capacitors 53. In accordance with this arrangement, only half of the voltage created by the arc is applied as triggering voltage to the controlled breakdown gap device 13. The operation of the invention in this form is, however, otherwise similar to the operation described in connection with FIGURE 1. A comparable form is illustrated in FIGURE 10, in which a single-trigger form of controlled breakdown gap device is used.

In the form of the invention shown in FIGURE 9, the controlled breakdown gap device 13 is replaced by a combination comprising a pair of controlled rectifier devices 72, 73. The controlled rectifiers 72, 73 are connected electrically and parallel with each other in reversed polarity relation and this combination is connected electrically in series with the resistor 14 in parallel relation to the circuit breaker 12. The gate electrode 75 of the controlled rectifier 72 is connected to the end arc plate 35A and the gate electrode 76 of the controlled rectifier 73 is connected to the opposite end arc plate 35B. In operation, let it be assumed that the controlled rectifier 72 and 73 are in nonconducting condition, and the circuit breaker 12 in the closed circuit condition. Upon the occurrence of a short circuit condition in the circuit controlled by the device, the solenoid 32 acts on the movable contact 24, drawing a pair of arcs as previously described which are rapidly transformed into a single arc which is moved into the arc chute portion of the circuit breaker 12. When the arc strikes the end arc plates 35A, 35B, the voltage appearing across the arc is also applied between the gates and cathodes of the rectifiers 72, 73, causing one of the gate electrodes 75, 76 to be strongly positive with respect to the cathode 77, 78 of the respective electrode, thereby placing this rectifier in the conducting condition. The current through the breaker is thereupon bypassed or shunted through the conducting rectifier and the resistor 14. The current will have been decreased very substantially by the circuit breaker by the time transfer occurs. The current will be further decreased by the action of the resistor 14 increasing its resistance since resistor 14 is preferably a positive temperature coefficient of resistance material. As the system voltage thereafter decreases to zero, the current in the circuit will reach zero. Both the rectifiers 72, 73 resume a non-conducting condition so that thereafter when the system voltage increases in the opposite sense, no further current flows, the flow of current being blocked by both rectifiers 72, 73.

It should be noted that by having the trigger electrode of the controlled breakdown gap device connected, as shown in FIGURES 1, 8, 9, and 10, to an arc-cooling plate rather than to one of the breaker stationary contacts or to one of its terminals two important advantages are obtained: (1) the source voltage is not impressed on the trigger electrode when the circuit breaker is open, and (2) the arc voltage, or the portion thereof used for triggering, is not impressed on the trigger electrode until the voltage across the entire arc is great enough to assure that transfer of the current to the bypass path will occur upon triggering.

The arc plate to which each trigger electrode of the controlled breakdown gap device is connected may be regarded as a probe positioned in the path of the arc. Thus if arc cooling plates as such were not required by the circuit breaker, a metallic probe would be utilized for each trigger, positioned in the path of the arc at the desired location.

The resistor 14 used in the test, the results of which are shown graphically in FIGURES 3 and 4, was .019 ohm, and its material was molybdenum. The resistance increased, due to heating after transfer of the current, to .143 ohm. The resistor used in the test, the results of which are shown graphically in FIGURE 5 was .035 ohm, and it was also of molybdenum. The resistance increased, due to heating after transfer of the current, to .206 ohm.

While the invention has been described in only certain particular embodiments, it will be readily apparent that many modifications thereof may readily be made by those skilled in the art.

Thus, for example, it is within the contemplation of the invention to provide, in addition to the high speed opening solenoid 32, conventional manual and automatic opening means or either of them. Such automatic opening means may, for example, include means for causing automatic opening of the contacts upon minor overload conditions, such as by a bimetallic strip heated in response to current in the circuit. Likewise, the mechanism may also include, in addition to such conventional "thermal" automatic opening means, means for causing automatic opening of the contacts upon overload conditions upon abnormal high current conditions above the "overload" range but below the extremely high range required to cause actuation of the solenoid 32, such as a magnetic releasing means for an automatic opening mechanism, not shown.

Accordingly, it is therefore intended by the appended claims to cover all such modifications as fall within the true spirit and scope of the invention.

What I claim as new and desire to secure by Letters Patent of the United States is:

1. An electric circuit interrupter comprising:
   (a) an electric circuit breaker including means for generating an arc along a predetermined path;
   (b) an interruption-assisting device including at least one input terminal, at least one output terminal, and at least one control terminal;
   (c) means connecting said interruption-assisting device electrically in parallel with said circuit breaker;
   (d) at least one metallic member carried by said circuit breaker and positioned in said predetermined path to be struck by said arc;
   (e) means connecting said control terminal of said interruption-assisting device to said metallic member so that when an arc is generated by said arc generating means, at least a portion of the voltage across said arc is impressed between said control terminal and at least one of said device input and output terminals;
   (f) said interruption-assisting device being normally in a substantially nonconducting condition and being changed to conducting condition upon the impression of said voltage between said control terminal and said one of said input and output terminals;
   (g) said interruption-assisting device returning to its said nonconducting condition upon cessation of current therethrough.

2. An electric circuit interrupter as set forth in claim 1 wherein said interruption-assisting device comprises a controlled-breakdown gap device having a hermetically sealed envelope evacuated to at least $10^{-5}$ mm. of mercury and first and second main electrodes supported in closely spaced relation in said envelope to define a gap and at least one trigger electrode, said input and output terminals being connected to said main electrodes respectively and said control terminal being connected to said trigger electrode.

3. For use in an alternating-current electric power system of predetermined nominal voltage, an electric circuit interrupter comprising:
   (a) an electric circuit breaker including means for generating an arc along a predetermined path;
   (b) an interruption-assisting device including at least one input terminal, at least one output terminal, and at least one control terminal;
   (c) means connecting said interruption-assisting device electrically in parallel with said circuit breaker;
   (d) at least one metallic member carried by said circuit breaker and positioned in said predetermined path to be struck by said arc;
   (e) means connecting said control terminal of said interruption-assisting device to said metallic member so that when an arc is generated by said arc generating means, at least a portion of the voltage across said arc is impressed between said control terminal and at least one of said device input and output terminals;
   (f) said interruption-assisting device being normally in a substantially nonconducting condition and being changed to conducting condition upon the impression of said voltage between said control terminal and said one of said input and output terminals;
   (g) said interuption-assisting device returning to its said nonconducting condition upon cessation of current therethrough;
   (h) said arc generating means comprising means for generating an arc having a voltage drop substantially greater than said nominal voltage of said power system.

4. For use in a alternating current electric power system of predetermined nominal voltage, an electric circuit interrupter comprising:
   (a) an electric circuit breaker including means for generating an arc along a predetermined path;
   (b) an interruption-assisting device including at least one input terminal, at least one output terminal, and at least one control terminal;
   (c) means connecting said interruption-assisting device electrically in parallel with said circuit breaker;
   (d) at least one metallic member carried by said circuit breaker and positioned in said predetermined path to be struck by said arc;
   (e) means connecting said control terminal of said interruption-assisting device to said metallic member so that when an arc is generated by said arc generating means, at least a portion of the voltage across said arc is impressed between said control terminal and at least one of said device input and output terminals;
   (f) said interruption-assisting device being normally in a substantially nonconducting condition and being changed to conducting condition upon the impression of said voltage between said control terminal and said one of said input and output terminals;
   (g) said interruption-assisting device returning to its said nonconducting condition upon cessation of current therethrough;
   (h) said arc generating means comprising means for generating an arc having a voltage drop substantially greater than said nominal voltage of said power system.

5. An electric circuit interrupter comprising:
   (a) an electric circuit breaker including means for generating an arc;
   (b) an interruption-assisting device including a hermetically sealed envelope evacuated to at least $10^{-5}$ mm. of mercury and first and second main electrodes supported in closely spaced relation to define a gap in said envelope;
   (c) means connecting said device electrically in parallel with said circuit breaker;
   (d) said device also including at least one control electrode in said envelope and a control terminal connected thereto;
   (e) means connecting said control terminal to a point of said circuit breaker such that when an arc is generated by said arc generating means, at least a portion of the voltage across said circuit breaker is impressed between said control electrode and at least one of said first and second electrodes;
   (f) said interruption-assisting device being normally in a nonconducting condition and being changed to conducting condition by breakdown of said gap upon the impression of said voltage between said control electrode and said one of said first and second main electrodes;
   (g) said interruption assisting device returning to its said nonconducting condition upon cessation of current therethrough by restoration of dielectric strength in said gap.

6. An electric circuit interrupter as set forth in claim 5 wherein said means connecting said control terminal to said circuit breaker comprises a capacitor in series relation between said control electrode and said point of connection of said circuit breaker.

7. An electric circuit interrupter for use in a system of alternating current power of predetermined voltage comprising:
   (a) an electric current breaker including input and output terminals;
   (b) an interruption-assisting device including at least one input terminal, at least one output terminal, and at least one control terminal;
   (c) means connecting said device electrically in parallel with said circuit breaker;
   (d) means connecting said control terminal to one of said circuit breaker terminals so that the voltage across said circuit breaker when in open condition is impressed between said control terminal and at least one of said device input and output terminals;
(e) said interruption-assisting device being normally in a substantially nonconducting condition and being changed to conducting condition upon the application of a "triggering" voltage of predetermined value between said control terminal and at least one of said input and output terminals;
(f) said interruption-assisting device returning to its nonconducting condition upon cessation of current therethrough;
(g) said predetermined value of said triggering voltage being higher than said predetermined voltage of said power system.

8. An electric circuit interrupter as set forth in claim 7 wherein said interruption-assisting device comprises a second control electrode in said envelope and a control terminal connected thereto, and means connecting said second control terminal to a point of said circuit breaker such that when an arc is generated by said arc generating means, at least a portion of the voltage across said arc is also impressed between said second control electrode and at least one of said first and second electrodes whereby breakdown of said interruption-assisting device is faciliated regardless of the polarity of current flow at the time of interruption.

9. An electric circuit interrupter as set forth in claim 7 wherein said circuit breaker also includes a plurality of spaced aligned arc cooling plates and said arc generating means includes means for moving said arc into said arc cooling plates, said point of connection of said control electrodes to said circuit breaker comprising a portion of one of said arc cooling plates.

10. An electric circuit interrupter as set forth in claim 7 wherein said circuit breaker also includes a plurality of spaced aligned arc cooling plates of metallic material and said arc generating means comprises means for moving said arc into said arc cooling plates, and said points of connection of said control electrodes to said circuit breaker comprise portions of two of said arc cooling plates respectively.

11. An electric circuit interrupter as set forth in claim 7, said circuit interrupter also including a plurality of spaced aligned metallic arc cooling plates, and said arc generating means comprises means for moving said arc into said arc cooling plates, said control electrode terminals both being connected to the central one of said arc cooling plates, there being an electrical capacitor connected in electrical series relation between said arc cooling plate and each of said control electrode terminals respectively.

12. An electric circuit interrupter comprising:
(a) an electric circuit breaker including at least two separable contacts movable between a closed position and an open position to draw an electric arc therebetween;
(b) a plurality of aligned spaced metallic arc cooling plates carried by said circuit breaker;
(c) said circuit breaker also including means for elongating said arc drawn between said contacts and for moving said arc into said arc cooling plates;
(d) said plurality of arc cooling plates including first and second end plates;
(e) an interruption-assisting device including a hermetically sealed envelope evacuated to at least $10^{-5}$ mm. of mercury and first and second main electrodes supported in closely spaced relation to define a gap in said envelope;
(f) a pair of control electrodes in said envelope;
(g) means including an electrical capacitor electrically connecting each of said control electrodes to one of said end arc plates respectively so that when an arc is drawn between said contacts and is moved into said arc cooling plates the voltage appearing across the main portion of said arc is impressed between each of said control electrodes and a corresponding one of said first and second main electrodes respectively;
(h) said interruption-assisting device being normally in nonconducting condition, said gap between said main electrodes being broken upon the occurrence of a predetermined voltage between at least one of said electrodes and a corresponding one of said main electrodes to change said device to conducting condition;
(i) said device returning to its said nonconducting condition upon cessation of current therethrough.

13. An electric circuit interrupter comprising:
(a) an electric circuit breaker including means for generating an electric arc;
(b) an interruption-assisting assembly comprising a pair of electric current control devices, each of said devices including a first and second main terminal and a third control terminal, each of said control devices having its main terminals connected electrically in parallel with said circuit breaker, and each of said control devices having its said control terminal connected to a point of said circuit breaker such that when an arc is generated by said arc generating means, at least a portion of the voltage across said circuit breaker is impressed between said control terminal and at least one of the main terminals of said control device respectively;
(c) each of said control devices being normally in a nonconducting condition and being changed to a conducting condition upon the application of a predetermined voltage between said control electrode and said one of said main terminals, each of said control devices, when in said conducting condition being capable of carrying current in a predetermined direction;
(d) said control devices being connected to said circuit breaker in such a senses that a first one of said control devices conducts current in a first direction to bypass said circuit breaker and the other of said control devices conducts current in the opposite direction to bypass said circuit breaker;
(e) each of said control devices returning to its said nonconducting condition upon the discontinuance of current therethrough.

14. An electric circuit interrupter as set forth in claim 13, wherein said current control devices of said interruption-assisting device each comprise a solid-state current control device of semiconductor material.

15. An electric circuit interrupter comprising:
(a) an electric circuit breaker including means for generating an electric arc;
(b) an interruption-assisting device including at least one input terminal, at least one output terminal, and at least one control terminal;
(c) means connecting said interruption-assisting device electrically in series with an electrical resistor and connecting this series combination electrically in parallel with said circuit breaker;
(d) means connecting said control terminal of said interruption-assisting device to a point of said circuit breaker such that when an arc is generated by said arc generating means at least a portion of the voltage appearing across said circuit breaker is impressed between said control terminal and at least one of said device input and output terminals;
(e) said interruption-assisting device being normally in a nonconducting condition and being changed to conducting condition upon the application of said voltage between said control terminal and said one of said input and output terminals;
(f) said interruption-assisting device returning to its said nonconducting condition upon the discontinuance of current therethrough.

16. An electric circuit interrupter as set forth in claim 15 wherein said resistor comprises material having a high positive temperature coefficient of resistance, whereby the value of said resistor increases substantially following transfer of current thereto from said circuit breaker.

References Cited

UNITED STATES PATENTS

| | | | |
|---|---|---|---|
| 1,819,207 | 8/1931 | Slepian | 200—144 |
| 1,861,129 | 5/1932 | Milliken | 200—144 |
| 2,208,399 | 7/1940 | Slepian | 317—11 |
| 2,480,622 | 8/1949 | Warnock | 200—146 |
| 2,878,402 | 3/1959 | Kohn | 200—144 X |
| 2,916,588 | 12/1959 | Wood | 200—147 |
| 3,040,212 | 6/1962 | Hermann et al. | 200—144 X |
| 3,087,092 | 4/1963 | Lafferty | 200—144 X |

FOREIGN PATENTS 344,867 3/1931 Great Britain.

ROBERT S. MACON, *Primary Examiner.*

U.S. Cl. X.R.

200—146; 317—11